(12) United States Patent
Huang (10) Patent No.: US 9,966,878 B2
(45) Date of Patent: May 8, 2018

(54) METHOD AND MODULAR SYSTEM FOR A POWER SYSTEM ARCHITECTURE

(71) Applicant: GE AVIATION SYSTEMS, LLC, Grand Rapids, MI (US)

(72) Inventor: Hao Huang, Troy, OH (US)

(73) Assignee: GE Aviation Systems LLC, Grand Rapids, MI (US)

(*) Notice: Subject to any disclaimer, the term of this patent is extended or adjusted under 35 U.S.C. 154(b) by 0 days. days.

(21) Appl. No.: 15/223,135

(22) Filed: Jul. 29, 2016

(65) Prior Publication Data
US 2018/0034385 A1 Feb. 1, 2018

(51) Int. Cl.
*H02M 7/797* (2006.01)

(52) U.S. Cl.
CPC .................. *H02M 7/797* (2013.01)

(58) Field of Classification Search
CPC ........ H02M 7/66; H02M 7/757; H02M 7/758; H02M 7/79; H02M 7/797
USPC ................. 363/123, 127, 131, 132
See application file for complete search history.

(56) References Cited

U.S. PATENT DOCUMENTS

| | | | |
|---|---|---|---|
| 5,477,091 A | 12/1995 | Fiorina et al. | |
| 5,852,558 A * | 12/1998 | Julian ................. | H02M 7/5387 363/132 |
| 6,002,603 A * | 12/1999 | Carver ................. | H02M 3/158 363/132 |
| 6,850,426 B2 | 2/2005 | Kojori et al. | |
| 6,856,045 B1 | 2/2005 | Beneditz et al. | |
| 7,050,313 B2 | 5/2006 | Huang et al. | |
| 7,221,062 B2 * | 5/2007 | Holl ........................ | B60K 6/46 307/10.1 |
| 7,538,521 B2 | 5/2009 | Berenger | |
| 7,615,892 B2 | 11/2009 | Anghel et al. | |
| 7,737,577 B2 | 6/2010 | Langlois et al. | |
| 7,821,145 B2 | 10/2010 | Huang et al. | |
| 7,906,866 B2 | 3/2011 | Anghel et al. | |
| 8,760,094 B2 | 6/2014 | Solodovnik et al. | |
| 9,628,008 B1 * | 4/2017 | Fedders ................... | H02P 9/02 |
| 2004/0196673 A1 * | 10/2004 | Shyi ..................... | A61F 2/30767 363/21.06 |
| 2012/0175945 A1 | 7/2012 | Ciccone et al. | |
| 2015/0061569 A1 * | 3/2015 | Alexander .......... | B60L 11/1809 320/101 |

OTHER PUBLICATIONS

Griffo, A., et al., "Design and Characterization of a Three-Phase Brushless Exciter for Aircraft Starter/Generator," IEEE Transactions on Industry Applications, vol. 49, Issue 5, pp. 2106-2115 (Sep.-Oct. 2013).
International Search Report and Written Opinion issued in connection with corresponding PCT Application No. PCT/US2017/037814 dated Sep. 12, 2017.

* cited by examiner

*Primary Examiner* — Yemane Mehari
(74) *Attorney, Agent, or Firm* — GE Aviation Patent Operation; William Scott Andes (57) ABSTRACT

A method and modular system for assembling a power system architecture includes a direct current (DC) output module having a first DC input and a DC output, a common power module having a DC input/output and an alternating current (AC) input/output, an AC output module having an AC input and a first AC output, and an exciter power module having a second DC input and a second AC output.

13 Claims, 7 Drawing Sheets

METHOD AND MODULAR SYSTEM FOR A POWER SYSTEM ARCHITECTURE

BACKGROUND OF THE INVENTION

Power electronics systems used in energy conversion. For example, it is common for a power electronics system in a power system architecture to receive a power supply from a power source such as an electric machine or generator, and convert the received power to a desired power destined for an electrical load. The conversion of the power supply to the desired power for the electrical load can be based on the electrical characteristics of the power system architecture of the electrical load.

BRIEF DESCRIPTION OF THE INVENTION

In one aspect, the present disclosure relates to a modular system for assembling a power system architecture including a common power module having a DC input/output and an alternating current (AC) input/output, and at least one of a direct current (DC) output module having a first DC input and a DC output or an AC output module having an AC input and a first AC output. The first DC input is configured to connect to the DC input/output or the AC input/output is configured to connect to one of the AC input, an AC input/output of a second common power module, or an AC generator output.

In another aspect, the present disclosure relates to a method of assembling a power electronic conversion system architecture including determining a power electronic conversion system architecture design, connecting a common power module having a DC input/output and an AC input/output to at least one of a DC output module having a first DC input and a DC output, an AC output module having an AC input and a first AC output, or an exciter power module having a second DC input and a second AC output based on the determined power electronic conversion system architecture design; detecting, by the common power module, the at least one of the DC output module, the AC output module, or the exciter power module, and operating the power electronic conversion system architecture based on the at least one detected module.

In yet another aspect, the present disclosure relates to a modular system for assembling a power system architecture in an aircraft including a DC output module having a first DC input and a DC output, a common power module having a DC input/output and an AC input/output, an AC output module having an AC input and a first AC output, and an exciter power module having a second DC input and a second AC output. The first DC input is configured to connect to the DC input/output, the AC input/output is configured to connect to one of the AC input, an AC input/output of a second common power module, or an AC generator output, the second DC input is configured to connect to the DC input/output, and the common power module and at least one of the DC output module, the AC output module, or the exciter power module is selectively connectable to assemble at least one of a DC output power system architecture configured for a starter/generator, a DC output power system architecture configured for a generator, an AC to DC power converter, an AC output power system architecture configured for a starter/generator, an AC output power system architecture configured for a generator, or an AC to AC power converter.

DESCRIPTION OF EMBODIMENTS OF THE INVENTION

While the invention can be implemented in any environment configured for converting, rectifying, modulating, or otherwise altering a first power from a power source to a second power. Aspects of the disclosure can be applied for any power source providing power, and can include, but is not limited to, electrical generators, starter/generators, electric machines, batteries, an alternating current (AC) power source such as three-phase or four-phase power, or a direct current (DC) power source. Additionally, aspects of the disclosure can be applied in many physical environments, including, but not limited to, an aircraft power system, a water or land-based vehicle power system, a permanent structure power system, or the like.

While "a set of" various elements will be described, it is understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Furthermore, while sensing or measuring current or voltage can be described, any sensor configured to sense or measure and electrical power characteristic can be included.

Connection references (e.g., attached, coupled, connected, and joined) are to be construed broadly and can include intermediate members between a collection of elements and relative movement between elements unless otherwise indicated. As such, connection or coupling references do not necessarily infer that two elements are directly connected and in fixed relation to each other. The exemplary drawings are for purposes of illustration only and the dimensions, positions, order and relative sizes reflected in the drawings attached hereto can vary.

Figure 1:
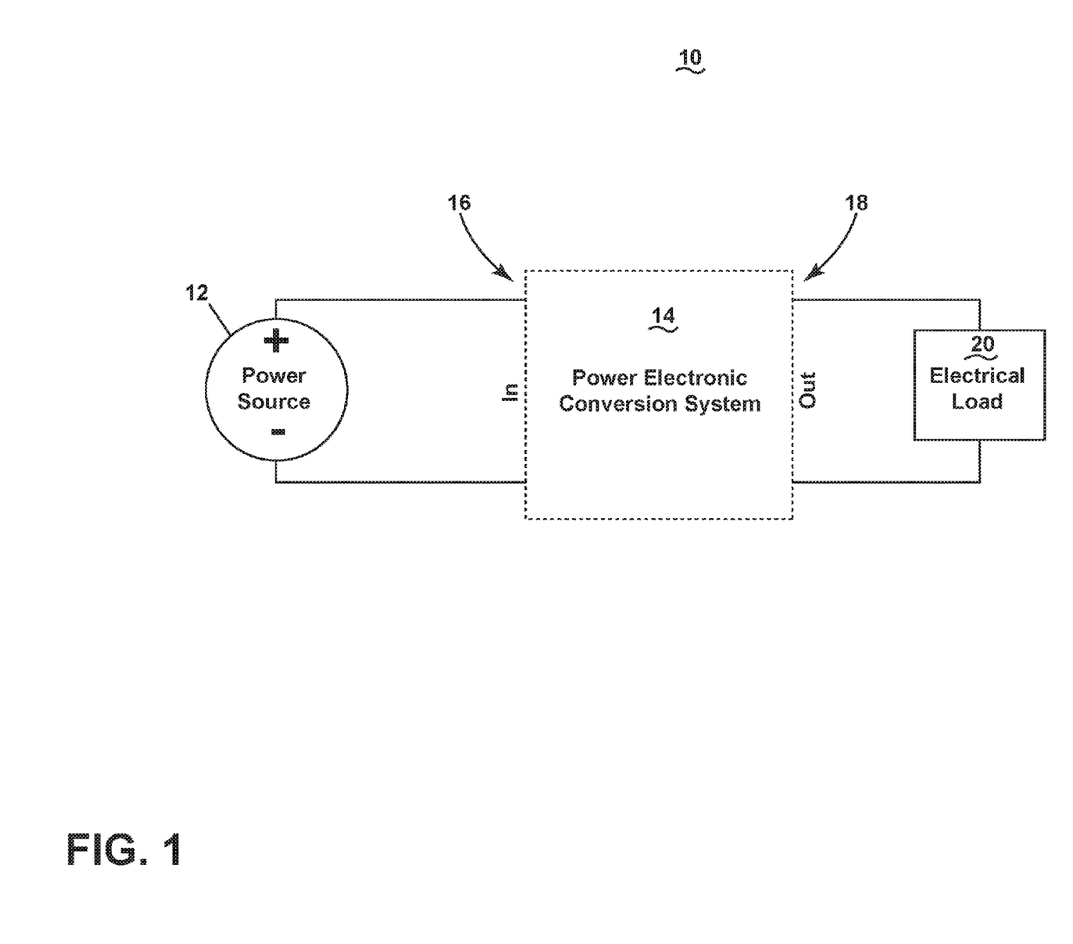
FIG. 1 is a schematic view of a power system architecture, in accordance with various aspects described herein.

FIG. 1 schematically illustrates a power system architecture 10 having a power source 12 configured or enabled to provide electrical power, a modular power electronic conversion system 14 having an input 16 and an output 18, and an electrical load 20. While the power system architecture can include a set of electrical loads, only a single electrical load 20 is schematically illustrated for brevity. The power source 12 is electrically coupled with the input 16 of the modular power electronic conversion system 14 and is configured to provide a first power from the power source 12 to the input 16 of the modular power electronic conversion system 14. The output 18 of the modular power electronic conversion system 14 is further electrically coupled with the electrical load 20 and configured to provide a second power from the output 18 of the modular power electronic conversion system 14 to the electrical load 20. The first power is converted, changed, modified, or otherwise altered by the modular power electronic conversion system 14 to a different second power. The altering of the first power to the second power can include any power modifications including, but not limited to, inversion, rectification, modulation, step-up or step-down voltage, or a combination there of. In one aspect of the disclosure, the second power can be a desired power selected or configured based on the power system architecture 10 or the electrical needs of, or based on, the electrical load(s) 20.

Figure 2:
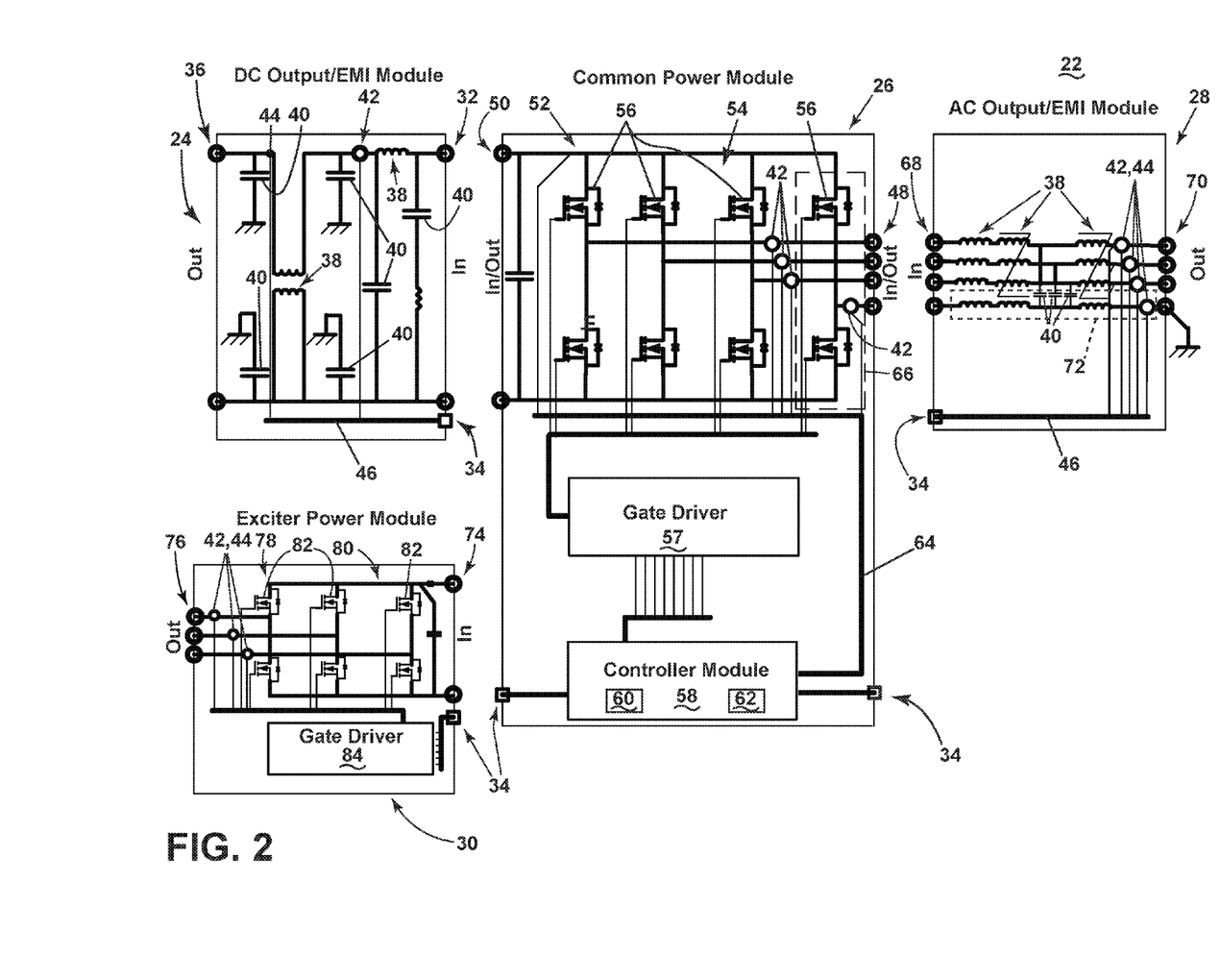
FIG. 2 is a schematic view of a set of modular power electronic conversion system components for the power system architecture of FIG. 1, in accordance with various aspects described herein.

FIG. 2 illustrates a set of modular power electronic conversion system components 22 that can be selectively provided as a portion of the modular power electronic conversion system 14 of FIG. 1. As shown, the set of modular power electronic conversion system components 22 can include a DC output or a combination DC output/electromagnetic interference (EMI) module 24, a common power module 26, an AC output or combination AC output/EMI module 28, and an exciter power module 30.

The DC output/EMI module 24 can include a set of power input leads 32 configured to receive a DC power input, a communication lead 34 or a communications port, and a set of power output leads 36 configured to provide a DC power output. The DC output/EMI module 24 can also include a set of power filtering elements, including but not limited to inductors 38, capacitors 40, electromagnetic interference filter, electromagnetic interference protection, chokes, transformers, or a combination thereof, and the like arranged between the electrically connected power input leads 32 and power output leads 36. The power filtering elements can be selectively configured, arranged, or provided to enable the EMI filtering, or a current, voltage, or power filtering of power received at the power input leads 32, and provide the filtered power to the power output leads 36.

The DC output/EMI module 24 can also include, for example, a current sensor 42 or a voltage sensor 44 electrically in-line between the power input leads 32 and the power output leads 36 configured to sense or measure current delivered between the input leads 32 to the output leads 36 or voltage at the output leads 36, respectively. The current sensor 42 or voltage sensor 44 can be configured to provide the respective sensing or measuring to a communication channel 46, communications bus, or communications line connected with the communication lead 34. In this sense, the current sensor 42 or voltage sensor 44 can provide the respective measurements to the communication lead 34.

The common power module 26 can include a first power input/output 48, a second power input/output 50, and at least one communication lead 34, illustrated as a two communication leads 34. The first power input/output 48 can include a set of power leads configured to provide or receive three-phase or four-phase AC power and the second power input/output 50 can include a set of power leads configured to provide or receive DC power. In one example configuration, four-phase power can include three AC phases and a neutral phase. The second power input/output 50 can include a set of power leads configured to provide or receive DC power.

A converter 52 can be disposed between the first and second power input/outputs 48, 50, and can include a transistor bridge 54 or power bridge having a set of controllable transistors 56. The converter 52, the transistor bridge 54, or the set of controllable transistors 56 can be communicatively coupled with a gate driver 57 and can be controlled in response to receiving a gate drive signal from the gate driver 57. The converter 52, the transistor bridge 54, or the set of controllable transistors 56 can operate in response to the gate drive signal to convert a first power, such as the power received at one of the first or second power input/outputs 48, 50, to a second power, provided to the other of the first or second power input/output 48, 50. Non-limiting examples of the first power or the second power can include 115 Volts AC at 400 Hz, plus or minus 270 Volts DC, or 120 Volts AC at 60 Hz.

The common power module 26 can also include a controller module 58 having a processor 60 and memory 62. The memory 62 can store a set of operational control profiles or programs for operating the gate driver 57, the converter 52, or the set of modular power electronic conversion system components 22. The memory 62 can include random access memory (RAM), read-only memory (ROM), flash memory, or one or more different types of portable electronic memory, such as discs, DVDs, CD-ROMs, etc., or any suitable combination of these types of memory. The controller module 58 can be operably coupled with the memory 62 such that one of the controller module 58 and the memory 62 can include all or a portion of a computer program having an executable instruction set for controlling the operation of the aforementioned components, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, controller module 58, or special purpose processing machine to perform a certain function or group of functions. In implementation, the functions can be converted to a computer program comprising a set of executable instructions, which can be executed by the processor 60.

The common power module can also include, for example, a set of current sensors 42 for each leg or phase of power coupled with the first power input/output 48 or a voltage sensor 44 coupled with the voltage output of the second power input/output 50. In this sense, the set of current sensors 42 can be configured to sense or measure current delivered through the corresponding set of multi-leg or multi-phase input/output leads 48 or the voltage sensor 44 can sense or measure the voltage at the second power input/output leads 50, respectively. The current sensor 42 or voltage sensor 44 can be configured to provide the respective sensing or measuring to a communication channel 64, communications bus, or communications line connected with the controller module 58. In this sense, the current sensor 42 or voltage sensor 44 can provide the respective measurements to the controller module 58. The controller module 58 can further be communicatively coupled with the at least one communication lead 34.

By way of a non-limiting example, the processor 60 or the controller module 58 can be configured to monitor the power converted by the converter 52, transistor bridge 54, or the set of controllable transistors 56 by way of the respective current or voltage sensors 42, 44 and communicated by the communication channel 64. In another aspect of the disclosure, the processor 60 or the controller module 58 can also be configured to monitor the power of another of the set of modular power electronic conversion system components 22 having at least one current or voltage sensor 42, 44. For example, another of the set of modular power electronic conversion system components 22 having a communication channel 46 connected with the respective sensor 42, 44, and further connected with the communication lead 34 of the common power module 26 can communicatively provide the sensed or measured values of the sensor 42, 44 to the processor 60 or controller module 58. The processor 60 or controller module 58 can further be configured to controllably operate a modular power electronic conversion system 14, a set or subset of the modular power electronic conversion system components 22, or the gate driver 57, based on the set or a subset of the sensed or measured values received.

By another way of non-limiting aspect of the disclosure, the processor 60 or controller module 58 can also be configured to drive, control, generate, or provide the gate drive signal for the transistor bridge 54 of the converter 52 to the gate driver 57, which in turn, can selectively operate the set of controllable transistors 56 to operate the transistor bridge 54. For instance, in one non-limiting configuration of the disclosure, the common power module 26 can be configured to receive DC power at the second power input/output 50 and convert the DC power received to a four-leg output at the first power input/output 48 having three-phase AC power and a neutral phase leg. In this example, the processor 60 or controller module 58 can operate a sine wave modulation profile or program, or a space vector modulation profile or program, such that the switching of the transistor bridge 54 provides the desired four-leg output to the first power input/output 48. In another non-limiting configuration of the disclosure, the common power module 26 can be configured to receive AC power at the first power input/output 48 and convert the AC power received to a DC power output at the second power input/output 50. In this example, the processor 60 or controller module 58 can operate a rectifying profile or program such that the transistor bridge 54 provides the desired DC output to the second power input/output 50.

While the common power module 26 is shown and described having a four-leg and four-phase set of leads at the first power input/output 48, aspects of the disclosure can be included wherein the common power module 26 is configured, arranged, or controllably operated to provide a three-leg or three-phase set of leads at the first power input/output 48. For example, an optional arrangement (illustrated by dotted line 66) of a subset of the transistor bridge 54 includes the set of transistors 56 for controllably operating the fourth leg or fourth lead of the input/output 48, as well as the current sensor 42 configured to sense or measure the current traversing the fourth leg. Aspects of the common power module 26 can be included wherein the optional components 66 for the fourth leg can be included, selectively enabled or selectively operable by at least one of the gate driver 57, the controller module 58, or the processor 60, or selectively removable based on the particular implementation of the modular power electronic conversion system 14 or power system architecture 10. In another aspect of the disclosure, multiple common power module 26 components can be included wherein a first version of the common power module 26 includes the four-leg or four-phase configuration of the first power input/output 48 while a second version of the common power module 26 includes the three-leg or three-phase configuration of the first power input/output 48.

The AC output/EMI module 28 can include a set of power input leads 68 configured to receive a three-phase or four-phase AC power input, a communication lead 34, and a set of power output leads 70 configured to provide a three-phase or four-phase AC power output. The AC output/EMI module 28 can also include a set of power filtering elements, including but not limited to inductors 38, capacitors 40, electromagnetic interference filter, electromagnetic interference protection, chokes, transformers, or a combination thereof, and the like arranged between the electrically connected power input leads 68 and power output leads 70. The power filtering elements can be selectively configured, arranged, or provided to enable the EMI filtering, or a current, voltage, or power filtering of power received at the power input leads 68, and provide the filtered power to the power output leads 70.

The AC output/EMI module 28 can also include, for example, a set of current sensors 42 or a voltage sensors 44 electrically in-line between the power input leads 68 and the power output leads 70 configured to sense or measure current delivered between the input leads 68 to the output leads 70 or voltage at the output leads 70, respectively. The current sensor 42 or voltage sensor 44 can be configured to provide the respective sensing or measuring to a communication channel 46, communications bus, or communications line connected with the communication lead 34. In this sense, the current sensor 42 or voltage sensor 44 can provide the respective measurements to the communication lead 34.

Aspects of the AC output/EMI module 28 can be included, similar to the common power module 26, wherein an optional arrangement (shown in dotted outline 72) can include a subset of the power filtering elements for the fourth leg or fourth phase, as well as the current or voltage sensors 42, 44 for the fourth leg. Aspects of the AC output/EMI module 28 can be included wherein the optional components 72 for the fourth leg can be included, selectively enabled or selectively operable, or selectively removable based on the particular implementation of the modular power electronic conversion system 14 or power system architecture 10. In another aspect of the disclosure, multiple AC output/EMI module 28 components can be included wherein a first version of the AC output/EMI module 28 includes the four-leg or four-phase configuration while a second version of the AC output/EMI module 28 includes the three-leg or three-phase configuration. As shown, aspects of the AC output/EMI module 28 having the fourth leg can be included wherein the fourth leg defines or is electrically coupled with a neutral or ground connection.

The exciter power module 30 can include a power input lead 74 configured to receive DC power, a power output lead 76 configured to provide three-phase power, and at least one communication lead 34. A converter 78 can be disposed between the power input and outputs leads 74, 76, and can include a transistor bridge 80 or power bridge having a set of controllable transistors 82. The converter 78, the transistor bridge 80, or the set of controllable transistors 82 can be communicatively coupled with a gate driver 84 and can be controlled in response to receiving a gate drive signal from the gate driver 84. The converter 78, the transistor bridge 80, or the set of controllable transistors 82 can operate in response to the gate drive signal to convert a first power, such as the DC power received at power input leads 74, to a second power, provided to the power output leads 76. The gate driver 84 can further be communicatively coupled with the communication lead 34. In one non-limiting example configuration, the operation of the gate driver 84, the converter 78, the transistor bridge 80, or the set of controllable transistors 82 can be configured to generate, induce, drive, or lead an exciter rotor of a generator or starter/generator (not shown).

In this example, when the exciter power module 30 is coupled with a generator or starter/generator, the exciter power module 30 can generate, induce, drive, or lead the exciter rotor via controlled excitation of a set of exciter stator windings. The generating, inducing, driving, or leading of the exciter stator windings by, for example, the gate driver 84 can operate to further control a phase, voltage, current, or power provided by the generator or starter/generator, such as when the generator or starter/generator are operating as a power source of the power system architecture 10. In another non-limiting aspect of the disclosure, the gate driver 84 can be communicatively coupled with a controller module 58 or a processor 60 of a common power module 26, and the memory 62 can also store a set of operational control profiles or programs for operating the gate driver 84. In this sense, the processor 60 or controller module 58 can communicatively provide, control, operate, or instruct the gate driver 84 to drive, control, generate, or provide the gate drive signal for the transistor bridge 80 of the converter 78, which in turn, can selectively operate the set of controllable transistors 82 to operate the transistor bridge 80 according to a generator excitation profile or program. The generator excitation profile or program can controllably convert the DC power received at the power input leads 74 to the excitation AC power provided to the power output leads 76.

The exciter power module 30 can also include, for example, a set of current sensors 42 or a voltage sensors 44 electrically in-line between the power input leads 74 and the power output leads 76 configured to sense or measure current delivered between the input leads 74 to the output leads 76 or voltage at the output leads 76, respectively. The current sensor 42 or voltage sensor 44 can be configured to provide the respective sensing or measuring to the communication lead 34, for example, by way of the gate driver 84. In this sense, the current sensor 42 or voltage sensor 44 can provide the respective measurements to the communication lead 34.

While the set of modular power electronic conversion system modular power electronic conversion system components 22 are illustrated having a particular input or output connected on a corresponding left or right side, configurations of the components 22 can be included with a mirrored arrangement. In this sense, the input/output and left/right configuration illustrated is merely one configuration illustrated for understanding, and additional configurations having opposite input or output connections on the opposing right/left hand sides are envisioned.

Aspects of the modular power electronic conversion system 14 can be included wherein a set or a subset of the modular power electronic conversion system components 22 can be selectively configured or arranged to provide for power conversion in a power system architecture 10. Further aspects of the disclosure can be included wherein the DC power input leads 32 of the DC output/EMI module 24 can be configured to selectively connect with the DC second power input/output of the common power module 26. Yet additional aspects of the disclosure can be included wherein the AC first power input/output 48 of the common power module 26 can be configured to selectively connect to one of the AC power input leads 68 of the AC output/EMI module 28, an AC first power input/output 48 of another common power module 26, or an AC output of a power source 12. In yet another aspect of the disclosure, the DC power input leads 74 of the exciter power module 30 can be configured to selectively connect with the DC second power input/output 50 of the common power module 26. In this sense, the modular power electronic conversion system 14 can include at least one common power module 26 and at least one of the grouping of a DC output/EMI module 24, an AC output/EMI module 28, or an exciter power module 30, to assembly the power system architecture 10.

Figure 3:
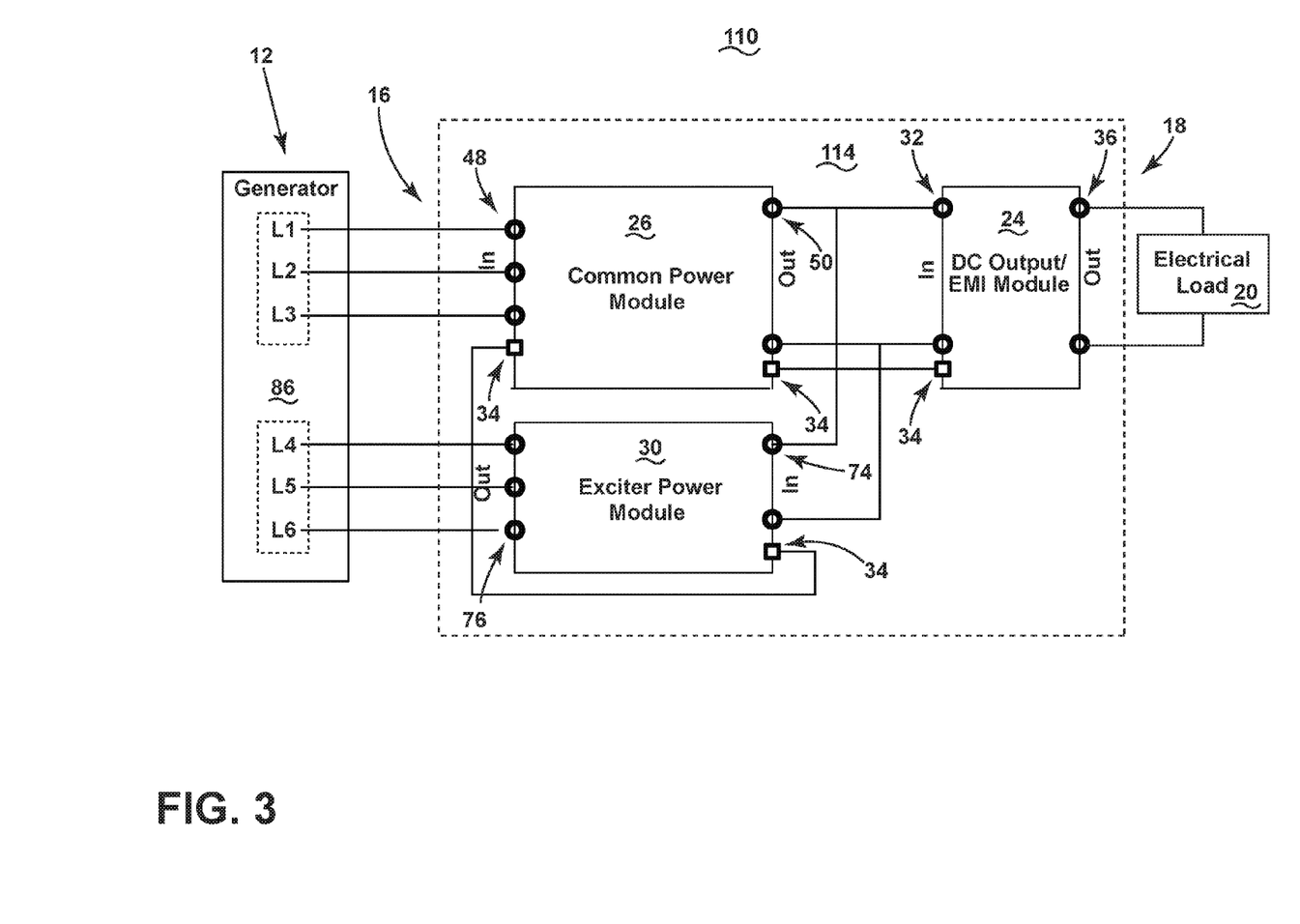
FIG. 3 is a schematic view of a power system architecture for a generator, in accordance with various aspects described herein.

FIG. 3 illustrates one aspect of the disclosure, wherein a subset of the modular power electronic conversion system components are arranged as a modular power electronic conversion system 114 for a power system architecture 110. In this non-limiting configuration, the modular power electronic conversion system 114 is arranged to be operable as an inverter/converter for a DC output starter/generator. In another aspect of this non-limiting configuration, the modular power electronic conversion system 114 is arranged to be operable as a converter for a DC output generator. As shown, the power source 12 can include a generator 86 or starter/generator having main machine stator windings configured to generate and provide three-phase power (L1, L2, and L3) to the input 16 of the modular power electronic conversion system 114. The three-phase power can be supplied from the input 16 of the modular power electronic conversion system 114 to the first power input/output 48 of a common power module 26.

The modular power electronic conversion system 114 can be further selectively configured to connect the power input leads 32 of a DC output/EMI module 24 to the second power input/output 50 of the common power module 26. The power output leads 36 of the DC output/EMI module 24 can be further connected with the output 18 of the modular power electronic conversion system 114, and ultimately, with the electrical load 20.

The power input leads 74 of an exciter power module 30 can also be connected to the second power input/output 50 of the common power module 26, electrically in parallel with the DC output/EMI module 24. The power output leads 76 of the exciter power module 30 can further be connected with a set of exciter windings (L4, L5, and L6) of the generator 86 or starter/generator. In this sense, aspects of the disclosure can provide for or enable an AC to DC power converter, or an AC output power system architecture 310 configured for a generator 86 or a starter/generator.

In another aspect of the disclosure, the exciter power module 30 can be communicatively coupled with the common power module 26 by way of connecting respective communication leads 34, and the DC output/EMI module 24 can be communicatively coupled with the common power module 26 by way of connecting respective communication leads 34.

Aspects of the illustrated modular power electronic conversion system 114 can operate as a converter to convert an AC output generated by a generator 86 to a DC output 18 suitable for an electrical load 20. For example, the common power module 26 can receive the three-phase power from the generator 86 and rectify the power received to a DC power provided to the second power input/output 50. The rectification can be accomplished or implemented by way of the transistor bridge 54, the gate driver 57, the controller module 58, the processor 60, a rectification program or profile stored in the memory 62, or a combination thereof. The DC power provided to the second power input/output 50 can be supplied to the DC output/EMI module 24 for filtering, as described herein, and ultimately provided to the electrical load 20.

A subset of the DC power provided by the second power input/output 50 can be supplied to the exciter power module 30 to generate, induce, drive, or lead the exciter rotor via controlled excitation of a set of exciter stator windings (L4, L5, L6) to further control a phase, voltage, current, or power provided by the generator 86 or starter/generator, as explained herein. In one non-limiting aspect of the disclosure, the various current or voltage sensors 42, 44 included in the modular power electronic conversion system components 24, 26, 30 can provide the sensed or measured current or voltage values to the controller module 58 or processor 60 of the common power module 26, by way of the communication leads 34. In this sense, the controller module 58 or the processor 60 can ensure the desired electrical characteristics of the power provided by the generator 86, the starter/generator to the modular power electronic conversion system 114, or the electrical characteristics of the power provided to the electrical load 20, are in line with expectations, desires, tolerances, or the like. In instances where the electrical characteristics are not in line with expectations or the like, the controller module 58 or processor 60 can, for example, control the gate driver 84 of the exciter power module 30 to effect the power generation of the generator 86 or starter/generator. In another instance where the electrical characteristics are not in line with expectations or the like, the controller module 58 or processor 60 can, for example, control the gate driver 57 of the common power module 26 to alter the transistor bridge 54 operation, as needed. Aspects of the disclosure can be included wherein a combination of controlling the gate driver 84 of the exciter power module 30 and controlling the gate driver 57 of the common power module 26 can be utilized for ensuring electrical characteristics are in line with expectations.

While the common power module 26 is illustrated having a three-phase first power input/output 48, non-limiting aspects of the disclosure can be included wherein a four-phase first power input/output 48 can be included, for example, to match the four-phase power generation of another generator 86 or starter/generator. Additionally, aspects of the disclosure can be included wherein the modular power electronic conversion system 114 illustrated can operate as a starting inverter for a starter/generator, wherein a supply of power can be provided to the common power module 26 or the exciter power module 30 to start the operation of the starter/generator.

Figure 4:
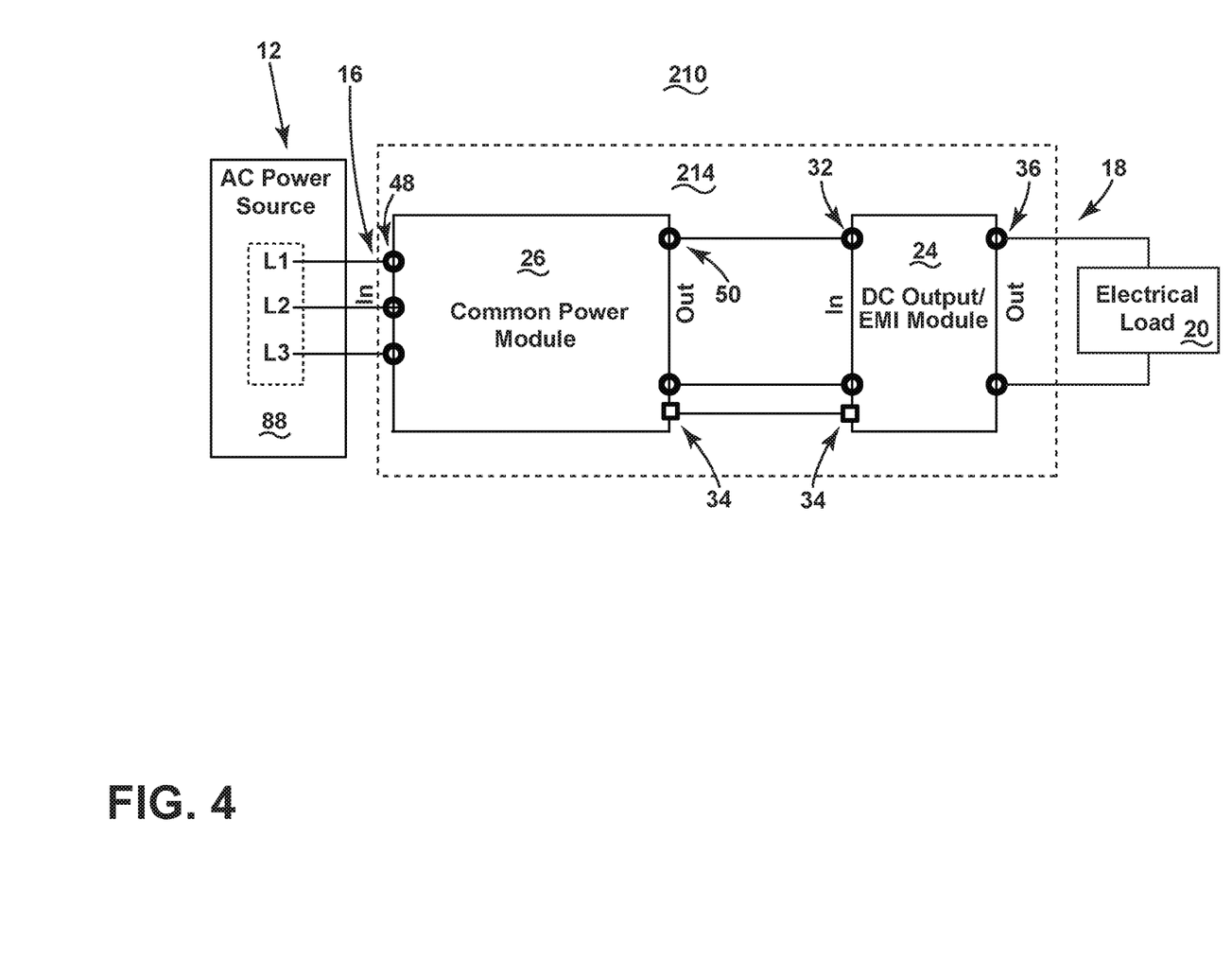
FIG. 4 is a schematic view of a power system architecture for a three-phase power source, in accordance with various aspects described herein.

FIG. 4 illustrates another aspect of the disclosure, wherein a subset of the modular power electronic conversion system components are arranged as a modular power electronic conversion system 214 for a power system architecture 210. In this non-limiting configuration, the modular power electronic conversion system 214 is arranged to be operable as an AC to DC converter. As shown, the power source 12 can include a three-phase AC power source 88, which can include, for instance, wall power, a generator, or the like. As shown, the three-phase AC power source 88 can be configured to generate and provide three-phase power (L1, L2, and L3) to the input 16 of the modular power electronic conversion system 214. The three-phase power can be supplied from the input 16 of the modular power electronic conversion system 214 to the first power input/output 48 of a common power module 26.

The modular power electronic conversion system 214 can be further selectively configured to connect the power input leads 32 of a DC output/EMI module 24 to the second power input/output 50 of the common power module 26. The power output leads 36 of the DC output/EMI module 24 can be further connected with the output 18 of the modular power electronic conversion system 214, and ultimately, with the electrical load 20. In this sense, aspects of the disclosure can provide for or enable an AC to DC power converter. In another aspect of the disclosure, the DC output/EMI module 24 can be communicatively coupled with the common power module 26 by way of connecting respective communication leads 34.

Aspects of the illustrated modular power electronic conversion system 214 can operate as a converter to convert an AC output generated by a three-phase AC power source 88 to a DC output 18 suitable for an electrical load 20. For example, the common power module 26 can receive the three-phase power from the power source 88 and rectify the power received to a DC power provided to the second power input/output 50. The rectification can be accomplished or implemented by way of the transistor bridge 54, the gate driver 57, the controller module 58, the processor 60, a rectification program or profile stored in the memory 62, or a combination thereof. The DC power provided to the second power input/output 50 can be supplied to the DC output/EMI module 24 for filtering, as described herein, and ultimately provided to the electrical load 20.

In one non-limiting aspect of the disclosure, the various current or voltage sensors 42, 44 included in the modular power electronic conversion system components 24, 26 can provide the sensed or measured current or voltage values to the controller module 58 or processor 60 of the common power module 26, by way of the communication leads 34. In this sense, the controller module 58 or the processor 60 can ensure the desired electrical characteristics of the power provided by the three-phase AC power source 88, the starter/generator to the modular power electronic conversion system 214, or the electrical characteristics of the power provided to the electrical load 20, are in line with expectations, desires, tolerances, or the like. In instances where the electrical characteristics are not in line with expectations or the like, the controller module 58 or processor 60 can, for example, control the gate driver 57 of the common power module 26 to alter the transistor bridge 54 operation, as needed, to ensure electrical characteristics are in line with expectations.

While the common power module 26 is illustrated having a three-phase first power input/output 48, non-limiting aspects of the disclosure can be included wherein a four-phase first power input/output 48 can be included, for example, to match the four-phase power generation of four-phase AC power source 88.

Figure 5:
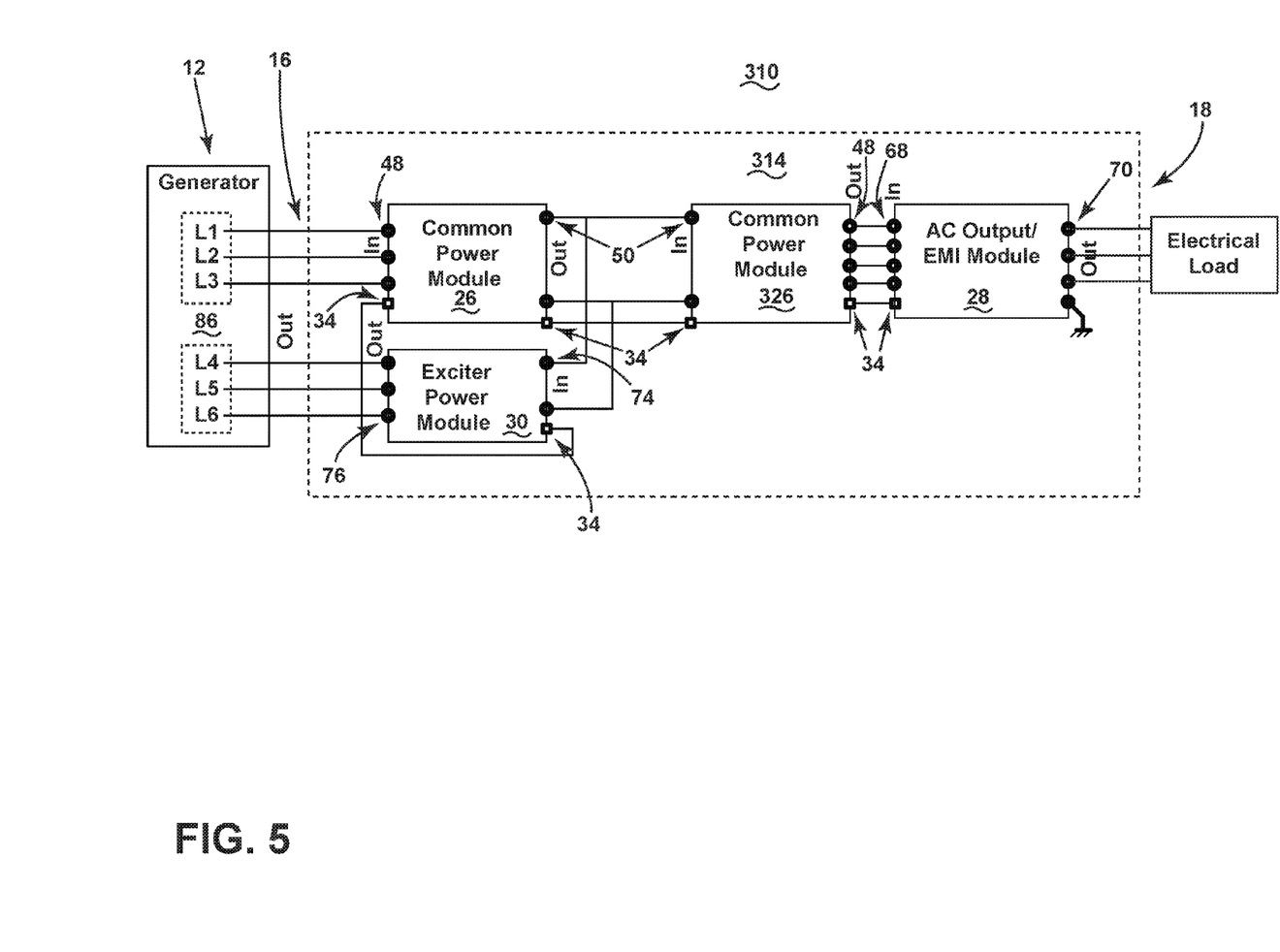
FIG. 5 is a schematic view of another power system architecture for a generator, in accordance with various aspects described herein.

FIG. 5 illustrates yet another aspect of the disclosure, wherein a subset of the modular power electronic conversion system components are arranged as a modular power electronic conversion system 314 for a power system architecture 310. In this non-limiting configuration, the modular power electronic conversion system 314 is arranged to be operable as an inverter/converter for an AC output starter/generator. In another aspect of this non-limiting configuration, the modular power electronic conversion system 314 is arranged to be operable as a converter/inverter for an AC output generator. As shown, the power source 12 can include the generator 86 or starter/generator having main machine stator windings configured to generate and provide three-phase power (L1, L2, and L3) to the input 16 of the modular power electronic conversion system 314. The three-phase power can be supplied from the input 16 of the modular power electronic conversion system 314 to the first power input/output 48 of a first common power module 26.

The modular power electronic conversion system 314 can be further selectively configured to connect the second power input/output 50 of a second common power module 326 to the second power input/output 50 of the first common power module 326. As illustrated, the first common power module 26 can have a first power input/output 48 configured to receive three-phase AC power from the generator 86 while the second common power module 326 can have a first power input/output 48 configured to provide four-phase AC power. The four-phase second power input/output 48 of the second common power module 326 can be connected with the power input leads 68 of an AC output/EMI module 28. The power output leads 70 of the AC output/EMI module 28 can be further connected with the output 18 of the modular power electronic conversion system 314, and ultimately, with the electrical load 20.

The power input leads 74 of an exciter power module 30 can also be connected to the second power input/output 50 of the first common power module 26, electrically in parallel with the second common power module 326. The power output leads 76 of the exciter power module 30 can further be connected with a set of exciter windings (L4, L5, and L6) of the generator 86 or starter/generator. In this sense, aspects of the disclosure can provide for or enable an AC to AC power converter, or an AC output power system architecture 310 configured for a generator 86 or a starter/generator.

In another aspect of the disclosure, the exciter power module 30 can be communicatively coupled with at least one of the first or second common power modules 26, 326, the common power modules 26, 326 can be communicatively coupled, and the AC output/EMI module 28 can be communicatively coupled with at least one of the first or second common power modules 26, 326, by way of connecting respective communication leads 34. In one non-limiting aspect of the disclosure, the communicative couplings can include cascading connections between serially connected modular components.

Aspects of the illustrated modular power electronic conversion system 314 can operate as a converter to convert a three-phase AC output generated by a generator 86 to a four-phase output 18 suitable for an electrical load 20. For example, the first common power module 26 can receive the three-phase power from the generator 86 and rectify the power received to a DC power provided to the second power input/output 50. The rectification can be accomplished or implemented by way of the transistor bridge 54, the gate driver 57, the controller module 58, the processor 60, a rectification program or profile stored in the memory 62, or a combination thereof. The DC power provided to the second power input/output 50 can be supplied to the second power input/output 50 of the second common power module 326 for inverting to a four-phase AC power provided to the first power input/output 48. The inverting can be accomplished or implemented by way of the transistor bridge 54, the gate driver 57, the controller module 58, the processor 60, an inverting program or profile stored in the memory 62, or a combination thereof. The inverted four-phase power can then be supplied from the first power input/output 48 of the second common power module 326 to the power input leads 68 of the AC output/EMI module 28 for filtering, as described herein, and ultimately provided to the electrical load 20.

A subset of the DC power provided by the second power input/output 50 of the first common power module 26 can be supplied to the exciter power module 30 to generate, induce, drive, or lead the exciter rotor via controlled excitation of a set of exciter stator windings (L4, L5, L6) to further control a phase, voltage, current, or power provided by the generator 86 or starter/generator, as explained herein. In one non-limiting aspect of the disclosure, the various current or voltage sensors 42, 44 included in the modular power electronic conversion system components 26, 28, 30, 326 can provide the sensed or measured current or voltage values to the controller module 58 or processor 60 of at least one of the first or the second common power modules 26, 326, or both, by way of the communication leads 34. In this sense, at least one of the controller modules 58 or the processors 60 can ensure the desired electrical characteristics of the power provided by the generator 86 or the starter/generator to the modular power electronic conversion system 314, or the electrical characteristics of the power provided to the electrical load 20, are in line with expectations, desires, tolerances, or the like. In instances where the electrical characteristics are not in line with expectations or the like, the at least one of the controller modules 58 or processors 60 can, for example, control the gate driver 84 of the exciter power module 30 to effect the power generation of the generator 86 or starter/generator. In another instance where the electrical characteristics are not in line with expectations or the like, the controller module 58 or processor 60 can, for example, control the gate driver 57 of the first or second common power module 26, 326, or of both common power modules 26, 326, to alter the respective transistor bridge 54 operations, as needed. Aspects of the disclosure can be included wherein a combination of controlling the gate driver 84 of the exciter power module 30 and controlling the gate drivers 57 of the first or second common power modules 26, 326 can be utilized for ensuring electrical characteristics are in line with expectations.

While the first common power module 26 is illustrated having a three-phase first power input/output 48, non-limiting aspects of the disclosure can be included wherein a four-phase first power input/output 48 can be included, for example, to match the four-phase power generation of another generator 86 or starter/generator. Additionally, aspects of the disclosure can be included wherein a four-phase first common power module 26 operates with the four-phase second common power module 326 to alter power received at the first power input/output 48 of the first common power module 26 to a different four-phase power provided at the first power input/output 48 of the second common power module 48. Likewise, aspects of the disclosure can include configurations wherein the first common power module 26 receives three-phase power that is altered to a different three-phase power provided by the second common power module 326, or wherein the first common power module 26 receives four-phase power that is altered to three-phase power provided by the second common power module 326. In yet another aspect of the disclosure, the modular power electronic conversion system 314 illustrated can operate as a starting inverter for a starter/generator, wherein a supply of power can be provided to at least one of the first or second common power modules 26, 326 or the exciter power module 30 to start the operation of the starter/generator.

Figure 6:
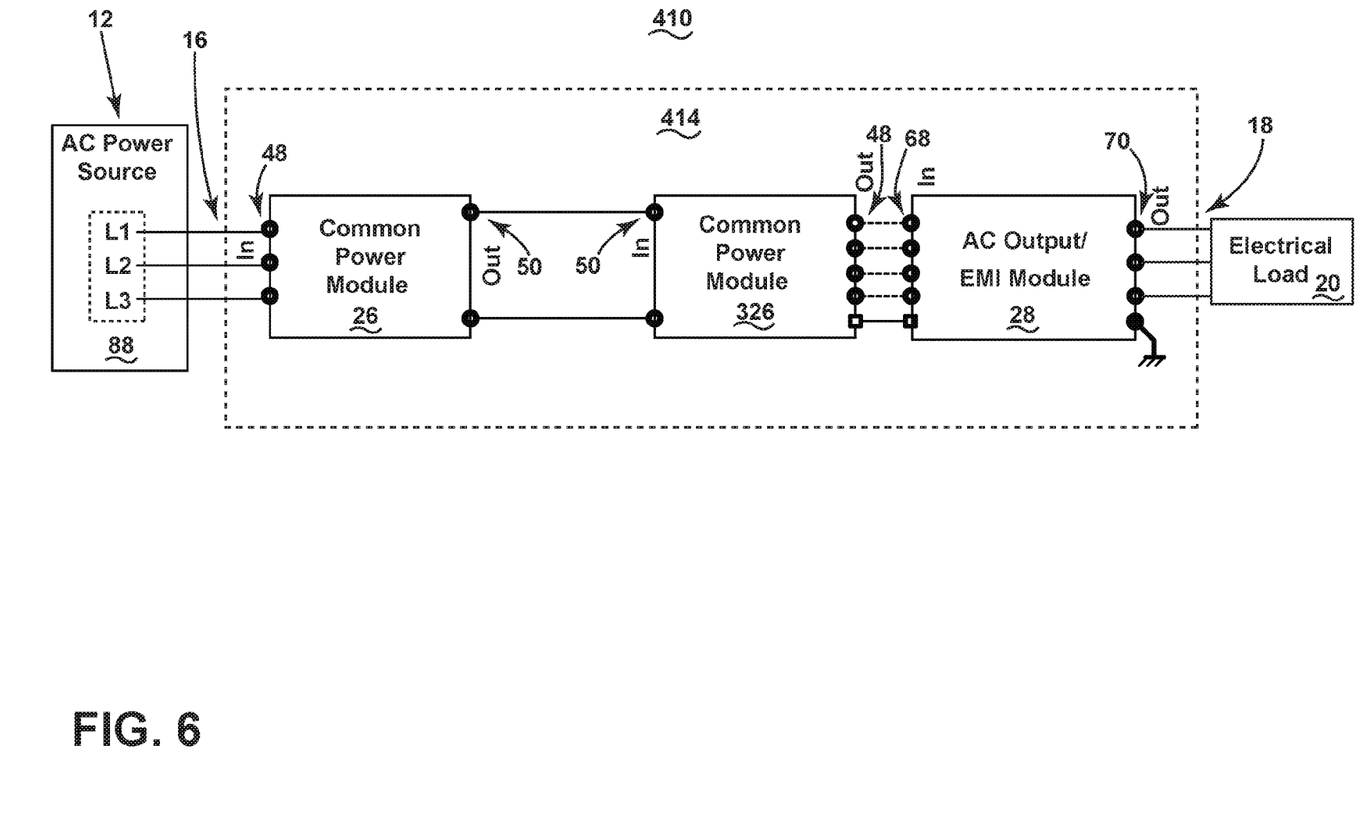
FIG. 6 is a schematic view of another power system architecture for a three-phase power source, in accordance with various aspects described herein.

FIG. 6 illustrates yet another aspect of the disclosure, wherein a subset of the modular power electronic conversion system components are arranged as a modular power electronic conversion system 414 for a power system architecture 410. In this non-limiting configuration, the modular power electronic conversion system 414 is arranged to be operable as an AC to AC converter. As shown, the power source 12 can include the three-phase AC power source 88 configured to provide three-phase power (L1, L2, and L3) to the input 16 of the modular power electronic conversion system 414. The three-phase power can be supplied from the input 16 of the modular power electronic conversion system 414 to the first power input/output 48 of a first common power module 26.

The modular power electronic conversion system 414 can be further selectively configured to connect the second power input/output 50 of the second common power module 326 to the second power input/output 50 of the first common power module 326. As illustrated, the first common power module 26 can have a first power input/output 48 configured to receive three-phase AC power from the three-phase AC power source 88 while the second common power module 326 can have a first power input/output 48 configured to provide four-phase AC power. The four-phase second power input/output 48 of the second common power module 326 can be connected with the power input leads 68 of the AC output/EMI module 28. The power output leads 70 of the AC output/EMI module 28 can be further connected with the output 18 of the modular power electronic conversion system 314, and ultimately, with the electrical load 20. In this sense, aspects of the disclosure can provide for or enable an AC to AC power converter.

In another aspect of the disclosure, the common power modules 26, 326 can be communicatively coupled, and the AC output/EMI module 28 can be communicatively coupled with at least one of the first or second common power modules 26, 326, by way of connecting respective communication leads 34. In one non-limiting aspect of the disclosure, the communicative couplings can include cascading connections between serially connected modular components.

Aspects of the illustrated modular power electronic conversion system 414 can operate as a converter to convert a three-phase AC output generated by a three-phase AC power source 88 to a four-phase output 18 suitable for an electrical load 20. For example, the first common power module 26 can receive the three-phase power from the three-phase AC power source 88 and rectify the power received to a DC power provided to the second power input/output 50. The rectification can be accomplished or implemented by way of the transistor bridge 54, the gate driver 57, the controller module 58, the processor 60, a rectification program or profile stored in the memory 62, or a combination thereof. The DC power provided to the second power input/output 50 can be supplied to the second power input/output 50 of the second common power module 326 for inverting to a four-phase AC power provided to the first power input/output 48. The inverting can be accomplished or implemented by way of the transistor bridge 54, the gate driver 57, the controller module 58, the processor 60, an inverting program or profile stored in the memory 62, or a combination thereof. The inverted four-phase power can then be supplied from the first power input/output 48 of the second common power module 326 to the power input leads 68 of the AC output/EMI module 28 for filtering, as described herein, and ultimately provided to the electrical load 20.

In one non-limiting aspect of the disclosure, the various current or voltage sensors 42, 44 included in the modular power electronic conversion system components 26, 28, 326 can provide the sensed or measured current or voltage values to the controller module 58 or processor 60 of at least one of the first or the second common power modules 26, 326, or both, by way of the communication leads 34. In this sense, at least one of the controller modules 58 or the processors 60 can ensure the desired electrical characteristics of the power provided by the three-phase AC power source 88 to the modular power electronic conversion system 414, or the electrical characteristics of the power provided to the electrical load 20, are in line with expectations, desires, tolerances, or the like. In instances where the electrical characteristics are not in line with expectations or the like, the at least one of the controller modules 58 or processors 60 can, for example, control the gate driver 57 of the first or second common power module 26, 326, or of both common power modules 26, 326, to alter the respective transistor bridge 54 operations, as needed.

While the first common power module 26 is illustrated having a three-phase first power input/output 48, non-limiting aspects of the disclosure can be included wherein a four-phase first power input/output 48 can be included, for example, to match the four-phase power generation of another generator 86 or starter/generator. Additionally, aspects of the disclosure can be included wherein a four-phase first common power module 26 operates with the four-phase second common power module 326 to alter power received at the first power input/output 48 of the first common power module 26 to a different four-phase power provided at the first power input/output 48 of the second common power module 48. Likewise, aspects of the disclosure can include configurations wherein the first common power module 26 receives three-phase power that is altered to a different three-phase power provided by the second common power module 326, or wherein the first common power module 26 receives four-phase power that is altered to three-phase power provided by the second common power module 326. In yet another aspect of the disclosure, the modular power electronic conversion system 414 illustrated can operate as a starting inverter for a starter/generator, wherein a supply of power can be provided to at least one of the first or second common power modules 26, 326 or the exciter power module 30 to start the operation of the starter/generator.

Figure 7:
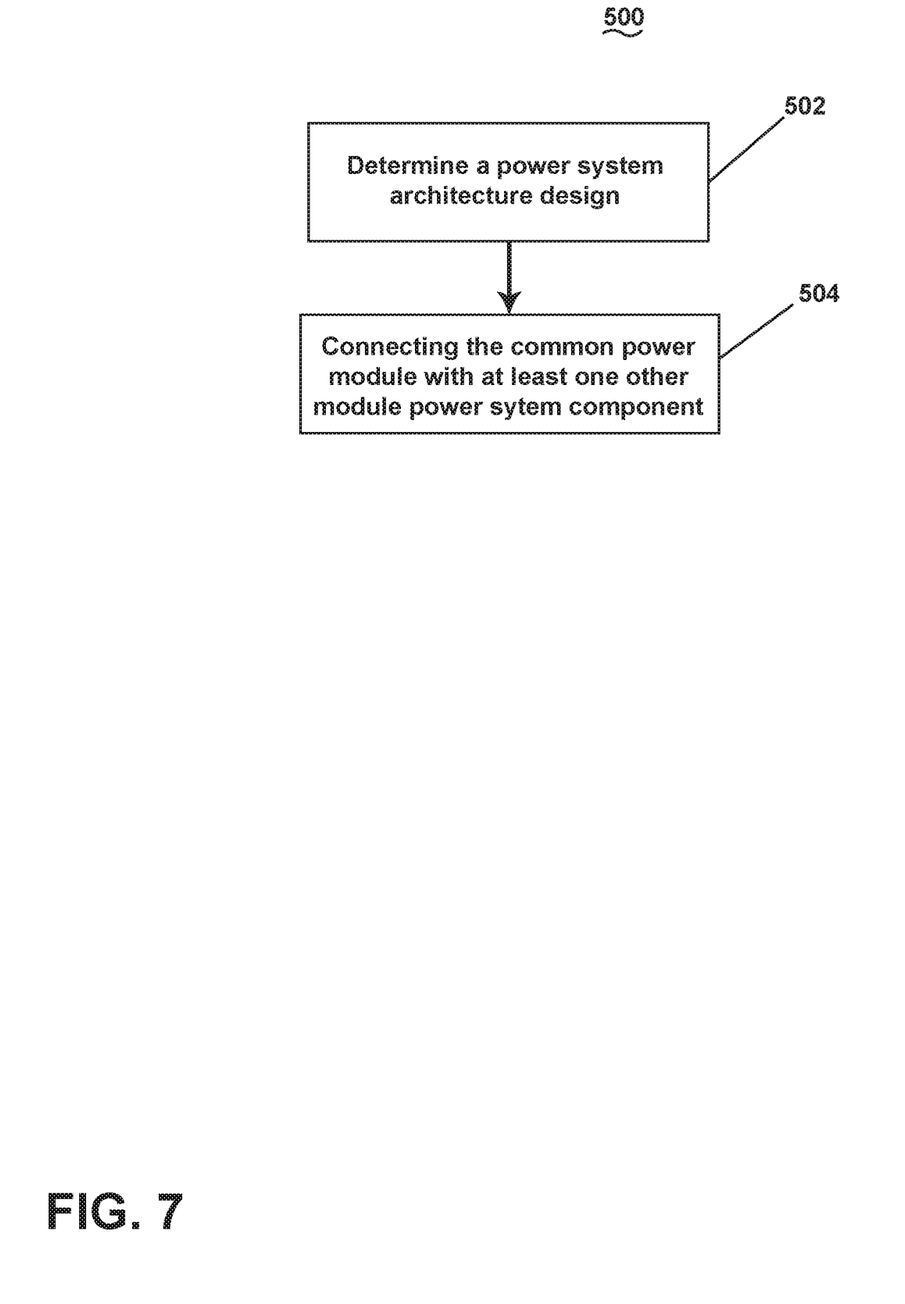
FIG. 7 is an example a flow chart diagram of demonstrating a method of assembling a power system architecture, in accordance with various aspects described herein.

FIG. 7 illustrates a flow chart demonstrating a method 500 of assembling a power system architecture 10, as described herein. The method 500 begins by determining at step 502 a power system architecture 10 design, for example, based on the desired electrical characteristics of one or more electrical loads 20, the power source 12 available, or a combination thereof. For example, in one non-limiting aspect of the disclosure, the desired electrical characteristics of the one or more electrical loads 20 can include at least one of a desired DC power output, a desired three-phase power output, or a desired four-phase power output.

Next, the method 500 includes connecting a common power module 26 having a DC second power input/output 50 and an AC first power input/output 48 to at least one of a DC output module 24 having a first set of DC power input leads 32 and a set of DC power output leads 36, an AC output module 28 having a set of AC power input leads 68 and a first set of AC power output leads 70, or an exciter power module 30 having a second set of DC power input leads 74 and a second set of AC power output leads 76 based on the determined power system architecture design 10.

The sequence depicted is for illustrative purposes only and is not meant to limit the method 500 in any way as it is understood that the portions of the method can proceed in a different logical order, additional or intervening portions can be included, or described portions of the method can be divided into multiple portions, or described portions of the method can be omitted without detracting from the described method. For example, the method 500 can include detecting, by the common power module 26, at least one other connected module, for example, by way of the various input or output connections, or by way of the communication lead(s) 34. The method 500 can further include operating the power electronic conversion system architecture based on the at least one detected module. For instance, in the non-limiting configuration illustrated in FIG. 3, the at least one of the common power module 26 or the controller module can be configured to detect the connection of the common power module 26 with at least one of the DC output/EMI module 24 or the exciter power module 30. Based upon the detected connection with the respective modules 24, 30, the common power module 26 can operate the power system architecture 110 as an inverter/converter for a DC output starter/generator or a converter for a DC output generator, as described herein.

Many other possible embodiments and configurations in addition to that shown in the above figures are contemplated by the present disclosure. In another non-limiting example embodiment of the disclosure, the generator can include a set of windings arranged to generate more or fewer phases of power at the main machine output than illustrated. For example, the generator can generate a single phase of power, two phases of power, six phases of power, etc. In such embodiments of the disclosure, the common power module 26, 326 can be configured to match the number of generated power phases (e.g. a bridge configured to rectify six phase power to DC power, etc.).

The method disclosed herein provides for and apparatus and method for configuring or operating a modular power electronic conversion system for a power system architecture. The technical effect is that the above described embodiments enable the configuration and operation of a modular power electronic conversion system capable of arranging a set or subset of modular power electronic conversion system components in a number of arrangements or configurations, and operating them as such to provide a desired power output from a power source, as needed. One advantage that can be realized in the above disclosure is that the method and apparatus enables a set of modular power electronic conversion system components that can be arranged or configurable to operate as a DC output power system architecture configured for a starter/generator, a DC output power system architecture configured for a generator, an AC to DC power converter, an AC output power system architecture configured for a starter/generator, an AC output power system architecture configured for a generator, or an AC to AC power converter, regardless of the three-phase AC power input. This allows for a common set of modular components that can be configured or arranged, for example, during installation, to provide a desired power output (AC or DC, including voltage and frequency characteristics), compared with conventional power system architectures that are pre-configured based on the input power and desired output power. Thus, a common set of modular power components can be configured for a set of generators or desired power outputs, and taken as an "off the shelf" component during installation, with minimal configurations to apply.

Another advantage that can be realized is that by utilizing a common set of modular power electronic conversion system components, costs to design, qualify, and maintain the set of components is reduced, yet the set is widely applicable to many power sources and desired power outputs. The modular solution allows for lower non-reoccurring and reoccurring cost to a customer or manufacturer, as well as lower costs to store fewer specialized parts to stock, allowing a lower cost maintain a fleet of aircraft, vehicles, generators, or power converter systems.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A modular system for assembling a power system architecture comprising:
   a common power module having a DC input/output and an alternating current (AC) input/output, wherein the common power module includes at least a three-leg power bridge, a controller module, a first communications port coupled with the controller module and a second communications port coupled with the controller module, and the controller module is communicatively coupled with the three-leg power bridge and configured to operate the three-leg power bridge to at least one of invert DC power received at the DC input/output to AC power provided to the AC input/output, or to convert AC power received at the AC input/output to DC power provided to the DC input/output;
   an exciter power module having a second DC input configured to connect to the DC input/output and a second AC output, and wherein the exciter power module includes a fifth communications port wherein the fifth communications port is configured to selectively couple with at least one of the first or second communication ports; and
   at least one of a direct current (DC) output module having a first DC input and a DC output or an AC output module having an AC input and a first AC output;
   wherein the first DC input is configured to connect to the DC input/output or the AC input/output is configured to connect to one of the AC input, an AC input/output of a second common power module, or an AC generator output.

2. The modular system of claim 1 wherein the DC output module includes a third communications port and a power sensor configured to sense power provided to the DC output, and wherein the third communications port is configured to selectively couple with at least one of the first or second communication ports.

3. The modular system of claim 1 wherein the AC output module includes a fourth communications port and a power sensor configured to sense the power provided to the first AC output, and wherein the fourth communications port is configured to selectively couple with the at least one of the first or second communication ports.

4. The modular system of claim 1 wherein the common power module includes a four-leg power bridge and a controller module communicatively coupled with the four-leg power bridge and configured to operate the four-leg power bridge to at least one of invert DC power received at the DC input/output to four-phase AC power provided to the AC input/output, or to convert four-phase AC power received at the AC input/output to DC power provided to the DC input/output.

5. The modular system of claim 1, further including an exciter power module having a second DC input configured to connect to the DC input/output and a second AC output, and wherein the exciter power module includes a three-leg power bridge configured to operate the exciter power module as an inverter to invert DC power received at the second DC input to a three-phase exciter power signal provided to the second AC output.

6. The modular system of claim 1 wherein at least one of the DC output module or the AC output module is configured to provide electromagnetic interference protection.

7. The modular system of claim 1 wherein the power system architecture can include at least one of a DC output power system architecture configured for a starter/generator, a DC output power system architecture configured for a generator, an AC to DC power converter, an AC output power system architecture configured for a starter/generator, an AC output power system architecture configured for a generator, or an AC to AC power converter.

8. The modular system of claim 7 wherein at least one of the DC output power system architecture configured for a starter/generator or the DC output power system architecture configured for a generator includes one common power module having the AC input/output coupled to the starter/generator power output or generator power output, one DC output module wherein the first DC input is coupled with the DC input/output, and further including an exciter power module having a second DC input configured to connect to the DC input/output and a second AC output, and wherein the second DC input is connected with the DC input/output and the second AC output is connected with an exciter stator of the starter/generator or generator.

9. The modular system of claim 7 wherein at least one of the AC output power system architecture configured for a starter/generator or the AC output power system architecture configured for a generator includes a first common power module having the AC input/output coupled to the starter/generator power output or generator power output, a second common power module having the DC input/output coupled to the DC input/output of the first common power module, an AC output module having the AC input coupled to the AC input/output of the second common power module, and one exciter power module having a second DC input wherein the second DC input is connected with the DC input/output and the second AC output is connected with an exciter stator of the starter/generator or generator.

10. A modular system for assembling a power system architecture in an aircraft comprising:
   a DC output module having a first DC input and a DC output;
   a common power module having a DC input/output and an AC input/output;
   an AC output module having an AC input and a first AC output; and
   an exciter power module having a second DC input and a second AC output;
   wherein the first DC input is configured to connect to the DC input/output, the AC input/output is configured to connect to one of the AC input, an AC input/output of a second common power module, or an AC generator output, the second DC input is configured to connect to the DC input/output; and
   wherein the common power module and at least one of the DC output module, the AC output module, or the exciter power module is selectively connectable to assemble at least one of a DC output power system architecture configured for a starter/generator, a DC output power system architecture configured for a generator, an AC to DC power converter, an AC output power system architecture configured for a starter/generator, an AC output power system architecture configured for a generator, or an AC to AC power converter.

11. The modular system of claim 10 wherein the common power module includes at least a three-leg power bridge and a controller module communicatively coupled with the three-leg power bridge and configured to operate the three-leg power bridge to at least one of invert DC power received at the DC input/output to AC power provided to the AC input/output, or to convert AC power received at the AC input/output to DC power provided to the DC input/output.

12. The modular system of claim 10 wherein the common power module includes a first communications port coupled with a controller module.

13. The modular system of claim 12 wherein the DC output module, the AC output module, and the exciter power module have corresponding communication ports configured to be selectively coupled with the first communications port.

* * * * *